United States Patent [19]

Emshoff et al.

[11] 4,432,878
[45] Feb. 21, 1984

[54] COOLING ARRANGEMENT AND METHOD OF OPERATING THE SAME

[75] Inventors: Horst W. Emshoff, Mülheim an der Ruhr; Walter Küsebauch, Erlangen, both of Fed. Rep. of Germany

[73] Assignee: Siemens Aktiengesellschaft, Munich, Fed. Rep. of Germany

[21] Appl. No.: 279,052

[22] Filed: Jun. 30, 1981

[30] Foreign Application Priority Data

Jul. 18, 1980 [DE] Fed. Rep. of Germany ....... 3027362

[51] Int. Cl.³ .............................................. B01J 47/14
[52] U.S. Cl. .................... 210/662; 210/685; 210/686; 210/96.1; 210/284
[58] Field of Search ...................... 310/52–54; 165/134; 210/662, 663, 669, 685, 686, 96.1, 167, 284, 290, 900

[56] References Cited

U.S. PATENT DOCUMENTS

| | | | |
|---|---|---|---|
| 2,934,655 | 4/1960 | Heller et al. | 310/55 |
| 3,454,491 | 7/1969 | Colburn | 210/662 |
| 3,711,731 | 1/1973 | Pluschke | 310/63 |
| 3,870,033 | 3/1975 | Faylor et al. | 210/900 |
| 4,120,787 | 10/1978 | Yargeau | 210/167 |

*Primary Examiner*—Ivars C. Cintins
*Attorney, Agent, or Firm*—Kenyon & Kenyon

[57] ABSTRACT

The invention relates to a cooling arrangement, particularly for cooling electrical devices with water-cooled electric conductors, with deionized cooling water (deionate) and a closed cooling system which contains a parallel loop with a mixed-bed filter. According to the invention, the mixed-bed filter is preceded by an alkalizing cation exchanger and an anion exchanger in OH-form, and the mixed-bed filter is provided with a by-pass. With this arrangement, the cooling water can be run in a higher pH-value range which for generators may preferentially be about 8 to 8.4.

6 Claims, 1 Drawing Figure

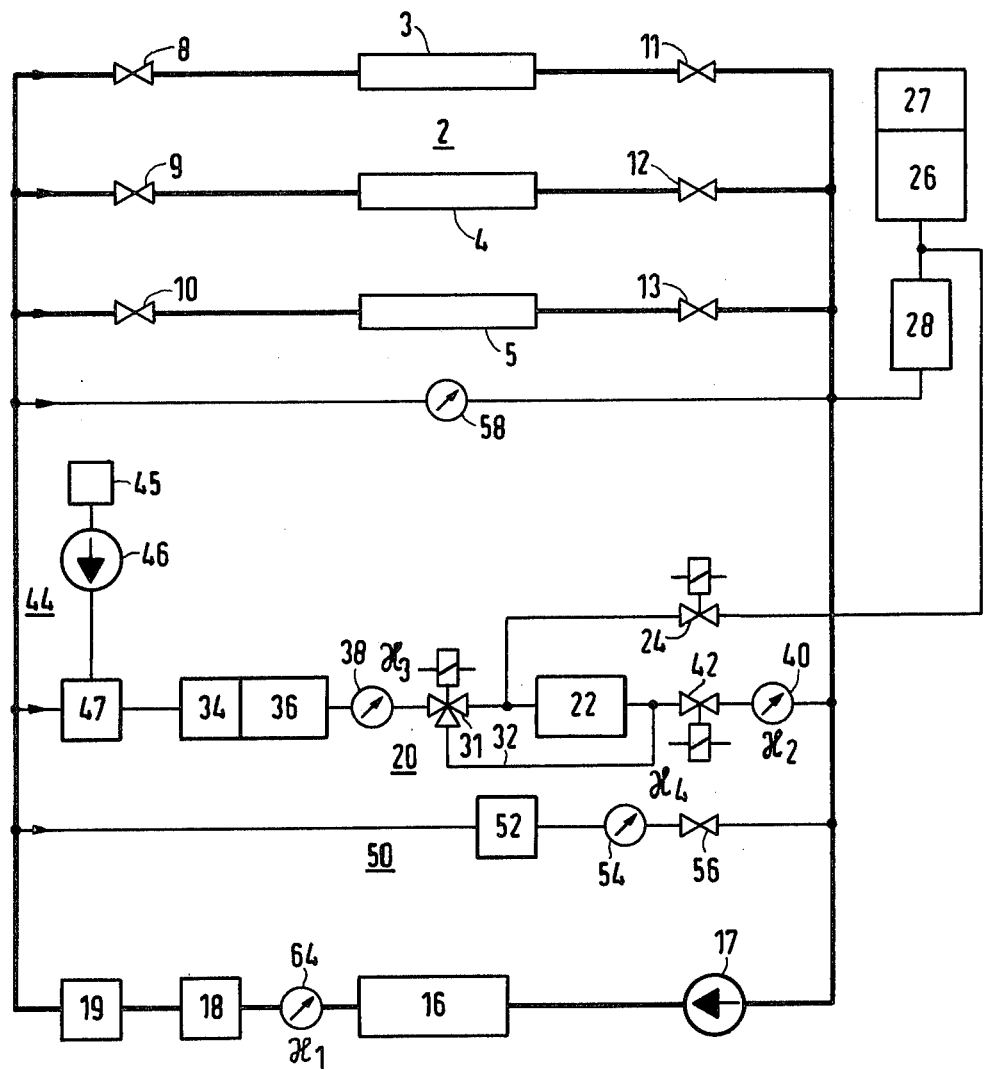

COOLING ARRANGEMENT AND METHOD OF OPERATING THE SAME

BACKGROUND OF THE INVENTION

The present invention relates to a cooling arrangement, particularly for cooling electrical devices with water-cooled electric conductors with deionized cooling water and a closed cooling system which contains a main loop and at least one parallel loop contaning a mixed-bed filter.

For cooling electrical devices having high power rating, for example, generators and travelling-field tubes as well as heavy-duty cables, closed cooling systems are provided, as is well known, which contain cooling water low in ions, so-called deionate. The cooling water flows through the current-carrying conductors of the device which generally consist of copper or copper alloys.

For cooling especially sensitive cooling points, for example, cooling heads and seals of the boiler circulating and boiler feed pumps in power generating stations, secondary loops are provided, as also is well known, which are likewsie constructed as closed cooling loops and may be provided with a mixed-bed filter. In order to maintain the electrolyte content in the cooling system as low as possible, a small partial stream of the cooling water, which may amount to about 0.5 to 5% of the volume of the water, can be conducted through a parallel loop which contains the mixed-bed filter. In such a cooling system, the cooling water acquires a very low electric conductivity which may be lower than 1 $\mu$S/cm. Part of the copper or the copper alloy can be removed by the cooling water through corrosion and deposited elsewhere or in following parts of the system. The corrosion removal rate depends on the pH-value of the cooling water and decreases with increasing pH-value. The pH-value has therefore, been raised in secondary cooling loops of power generating stations by the addition of sodium hydroxide to a value of at least 9. (VGB-Kraftwerkstechnik 59, September 1979, pages 720 to 724).

The existing mixed-bed filter which has, as is well known, the purpose to filter metal ions, for example, copper, nickel and iron ions and anions, for example, $HCO_3^-$ ions, out of the cooling waters, is an obstacle to alkalizing the cooling water in the cooling system. The mixed-bed filter generally contains a hydrogen loaded cation exchanger and a hydroxide loaded anion exchanger. If an alkalizer is used, the cations of the alkalizer are filtered out of the loop again by the cation exchanger of the mixed-bed filter. A predetermined pH-value thus can be maintained only by continuous addition of alkalizer and, hence, the cation exchanger is consumed and must be renewed correspondingly more often.

SUMMARY OF THE INVENTION

It is an object of the present invention to prevent deposits, particularly due to corrosion products, in closed cooling systems using deionized cooling water, wherein the foregoing difficulties are avoided.

According to the present invention, this and other objects are achieved by the provision of a cooling arrangement comprised of a closed cooling system, using deionized cooling water, having a main loop and a parallel loop with a mixed-bed filter, wherein an ion exchanger system containing an alkalizing cation exchanger and an anion exchanger in the hydroxide form precedes the mixed-bed filter, and wherein the mixed-bed filter is provided with a bypass.

When the device to be cooled is started up, a partial stream of cooling water is conducted through the series-connected ion exchanger system. If, for example, sodium hydroxide is used as the alkalizer, a sodium-charged cation exchanger is used which exchanges metal ions present for sodium ions. The anion exchanger exchanges anions present for $OH^-$ ions. In addition, the alkalizer is physically flushed out. This cooling water containing the alkalizer can then be conducted through the following mixed-bed in order to intercept an excess of alkalizer. A partial stream is fed to the main loop, bypassing the mixed-bed, and the pH-value in the main loop is increased thereby. During operation, the pH-value in the main loop can be controlled via the ratio of the volumetric flows through the mixed-bed and, bypassing the mixed bed, through the bypass. The cooling water in the parallel loop is conducted through the cation exchanger and the anion exchanger as well as the bypass. The bypass is closed and the mixed-bed filter is connected into the flow as soon as the pH-value of the cooling water has reached an upper limit. The mixed-bed filter is disconnected and the bypass opened as soon as the pH-value of the cooling water decreases again.

Gradually, a stable equilibrium adjusts itself, in which the volumetric flow through the mixed-bed can be shut off completely.

The alkalizing cation exchanger and the OH-loaded anion exchanger which precede the mixed-bed filter, can be separate or in mixed form.

The system also is stable against air break-ins and, in particular, carbon dioxide influence because the dissolved bicarbonate is competely intercepted by the anion exchanger for pH-values larger than 8.

Feeding-in of a substance with alkaline action, preferably sodium hydroxide, advantageously can be provided in the parallel loop ahead of the cation exchanger.

In a preferred embodiment of the cooling arrangement, a parallel loop with a series connection of a cation exchanger and a conductivity measuring cell may further be provided. As the cation exchanger there preferably is used a strongly acid resin in H-form which is particularly pure. With this arrangement, the pH-values of the cooling water can be determined in very good approximation in a simple manner.

DETAILED DESCRIPTION OF THE INVENTION

To explain the invention in further detail, reference is made to the drawing, where an arrangement for cooling electrical devices is schematically illustrated as an embodiment example of the invention.

In the FIGURE, an arrangement for cooling an electrical device with water-cooled electric conductors is shown which may, for example, be a generator 2, the stator winding of which is designated with 3, the rotor winding with 4 and the stator lamination stack with 5, and are arranged parallel to each other in the main cooling loop, each in series with two valves. The valves designated in the FIGURE with 8 to 13 may preferably be throttling valves. The main cooling loop further contains a heat exchanger 16 as well as a pump 17 and a mechanical filter 18 and a magnetic filter 19. In a parallel loop 20, a mixed-bed filter 22 is provided, the input of which may also be connected via a magnetic valve 24 to an expansion vessel 26 which serves for feeding-in fresh cooling water and is separated from the atmosphere by a nitrogen cushion 27. The fresh water fed from the expansion vessel 26 to the cooling loop can therefore be purified by the mixed-bed filter 22. From the expansion vessel 26 which serves as a water supply tank, about 1 liter of fresh water per day, for example, is fed to the cooling loop. It may in some circumstances be advantageous to have a mixed-bed filter 28 follow the expansion vessel 26.

The mixed-bed filter 22 is preceded by a three-way valve which preferably may consist of a combination of two magnetic valves and controls the cooling water flow through the mixed-bed filter 22 and the bypass 32. The mixed-bed filter 22 is preceded by a sodium-loaded cation exchanger 34 and an anion exchanger 36 in OH-form. This parallel loop contains further a conductivity measuring cell 38 which is arranged after the anion exchanger, and a further conductivity measuring cell 40 which is arranged in series with a valve 42 which may preferably be a magnetic valve, behind the mixed-bed filter 22. In the parallel loop 20 is further provided a feed 44 for sodium hydroxide, which is used as the alkalizer. The feed 44 consists of a tank 45, a solution pump 46 and a mixer 47.

In a parallel loop 50, a cation exchanger 52 in series with a conductivity measuring cell 54 and a throttling valve 56 is provided. The conductivity measuring cell 54, together with a conductivity measuring cell 64 arranged in the main loop allows determination of the pH-value of the cooling water.

The conductivity measuring cells 38, 40, 54 and 64 preferably can serve simultaneously as signal generators for monitoring and controlling the pH-value and may consist of a combination of a measuring cell with a measuring-value converter.

Through the design of the cooling system with the parallel loop 20, the pH-value is to be held, for example, between 8 and 8.4 and preferably at about 8.3, in the arrangement for cooling the generator 2, because at higher pH-values, an excessively high electric conductivity is obtained.

When the cooling system is being put in operation, the sodium hydroxide feed 44 is initially closed. Also the bypass 32 preferably can be closed. The three-way valve 31 opens the cooling flow to the mixed-bed filter 22 and also the valve 42 after the mixed-bed filter 22 is opened. The cooling water is deionized by means of the sodium-containing cation exchanger 34 and the OH$^-$-loaded anion exchanger 36 and by means of the mixed-bed 22. In addition, the sodium-loaded cation exchanger 34 is free of excess sodium hydroxide. As soon as the conductivity $x_1$ in the main loop reaches a lower limit of, for example, 0.1 $\mu$S/cm and the conductivity $x_3$ behind the anion exchanger 36, which can be determined by means of the conductivity measuring cell 38, has likewise reached a lower limit of, for example, 1 to 2 $\mu$S/cm, the bypass 32 is opened via the three-way valve 31 and the mixed-bed filter 22 is switched off.

This lifts the pH-value in the main loop, which can reach an upper limit which will not substantially exceed 8.4.

If this upper limit is reached during the operation, the bypass 32 is closed and the mixed-bed 22 is switched on again. The mixed-bed filter 22 is turned off again and the bypass 32 opened as soon as the pH-value of the cooling water drops.

If, with the bypass 32 open and the mixed-bed filter 22 closed, the pH-value drops to a lower limit, for example, 8.0, the sodium hydroxide feed 44 is opened and the cation exchanger 34 is charged with sodium.

At a pH-value of about 8.3, the dissolved copper ion concentrations as well as iron and nickel ion concentrations which can be expected according to the Pourbaix diagram under equilibrium conditions, are very low and contribute only little to the conductivity of the cooling water. A stable equilibrium with a low copper level therefore adjusts itself.

Regeneration of the sodium-loaded cation exchanger 34 is possible during the operation of the cooling arrangement in a simple manner by feeding sodium hydroxide to the parallel loop from the tank 45, if cooling water flows through the cation exchanger 34, the anion exchanger 36 and the mixed-bed filter 22. In this manner, metal ions are exchanged in the cation exchanger 34 for sodium ions and the released ions are filtered-out in the mixed-bed filter 22.

In one preferred embodiment of the cooling arrangement, the pH-value of the cooling water can be determined by measurement of the electric conductivity $x_1$ in the main loop by means of the conductivity measuring cell 64 and the measurement of a further conductivity $x_4$ in the additional parallel loop 50 behind the H-loaded cation exchanger 52 by means of the conductivity measuring cell 54. The conductivity in the main loop is caused by cations and anions which can be divided into two groups. To the first group belong the Na$^+$-ions and metal ions such as positive copper, iron or nickel ions, in which the OH$^-$-anion is present as a partner. To the second group belong all cations which have another anion as a partner. If this water flows through the hydrogen-loaded cation exchanger 52, the cations of the first group are exchanged for the H$^+$-ions and water is formed. The conductivity contribution is made only via the dissociation of the water. The cations of the second group also are exchanged for H$^+$ ions; however, they contribute to the conductivity as do the corresponding anions. At low concentrations, complete dissociation can be assumed and the conductivity thus is obtained from the degree of dissociation ($\chi 1$), the charge number, the mobility and the concentration of the ions. The limits of the ion mobilities in aqueous solution are known. Since the conductivity of the cations to the anions is proportional to their mobility, the conductivity of the OH$^-$ ions can be calculated in approximation and the pH-value then is obtained as the negative logarithm of the H-ion concentration as:

$$pH = -\log \frac{1_K + 1_{OH}}{1000} \cdot K_w + \log \left( x_1 - \frac{1_A + 1_K}{1_H + 1_A} \cdot x_4 \right)$$

where $1_K$ is the mean ion mobility of the cations Na$^+$, Cu$^{++}$, Ni$^{++}$, Fe$^{++}$ present in the cooling loop if sodium hydroxide is used as alkalizer.

$1_{OH}$ is the OH$^-$ ion mobility, $K_w$ is the ion product of the water, $1_A$ is the mean ion mobility of the anions HCO$_3^-$, CO$_3^{--}$, SO$_4^{--}$, Cl$^-$ present in the cooling loop, and $1_H$ is the H$^+$ ion mobility.

These variables are temperature-dependent. For a temperature of, for example 298° K., the pH-value is obtained in very good approximation from the simplified relation $$pH = 14.6 + \log(x_1 - 0.2768\, x_4).$$

In the embodiment example, sodium hydroxide is provided as the alkalizer and the cation exchanger 34 is accordingly a sodium-charged cation exchanger. In conjunction with potassium hydroxide (KOH) as the alkalizer, a potassium-charged cation exchanger will be provided. In some circumstances it may be advisable to use also other alkalizers, for example, hydrazine ($N_2H_4$) or ammonia ($NH_3$) as well as lithium hydroxide (LiOH).

If another alkalizer is used instead of the sodium hydroxide, a small deviation of the constants in the relation given for the pH-value is obtained.

What is claimed is:

1. In a cooling arrangement using deionized cooling water wherein a closed cooling system is provided containing a main loop and a parallel loop, said parallel loop having a mixed-bed filter, the improvement comprising preceding said mixed-bed filter in said parallel loop with an alkalizing cation exchanger and an anion exchanger in the hydroxide form, and providing means for bypassing said mixed-bed filter.

2. The cooling arrangement according to claim 1 wherein means for providing a feed of alkalizer in the parallel loop is arranged preceding said alkalizing cation exchanger.

3. The cooling arrangement according to claim 1 including an additional parallel loop having a cation exchanger in series with a conductivity measuring cell.

4. A method for operating a cooling arrangement, said cooling arrangement comprising a closed cooling system containing a main loop and a parallel loop, said parallel loop having an alkalizing cation exchanger, an anion exchanger in the hydroxide form and a mixed-bed filter in series, and means for bypassing said filter, comprising conducting water in said parallel loop through the alkalizing cation exchanger, the anion exchanger and through said bypass, closing said bypass and connecting said mixed-bed filter into the parallel loop when the pH-value of the cooling water reaches a predetermined upper limit, and thereafter disconnecting said mixed-bed filter and opening said bypass when the pH-value of the cooling water drops from said upper limit.

5. The method according to claim 4 wherein said arrangement includes an alkalizer feed to the parallel loop preceding said cation and anion exchangers, and wherein said feed is opened if, with said bypass open, the pH-value of the cooling water drops to a predetermined lower limit.

6. The method according to claim 5 wherein said alkalizer is fed to the parallel loop ahead of the cation exchanger is the cooling water is conducted through said cation exchanger, the anion exchanger and the mixed-bed filter.

* * * * *